United States Patent [19]
Kim

[11] Patent Number: 6,037,978
[45] Date of Patent: Mar. 14, 2000

[54] SYNC SIGNAL SELF-TEST DEVICE AND METHOD

[75] Inventor: Eun-Sup Kim, Kyungki-do, Rep. of Korea

[73] Assignee: SamSung Electronics Co., Ltd., Kyungki-do, Rep. of Korea

[21] Appl. No.: 08/829,442

[22] Filed: Mar. 28, 1997

[30] Foreign Application Priority Data

Mar. 28, 1996 [KR] Rep. of Korea .................. 96-8906

[51] Int. Cl.[7] ...................................... H04N 5/04
[52] U.S. Cl. .................. 348/194; 348/181; 348/569; 348/510; 345/213
[58] Field of Search .................... 348/553, 554, 348/555, 558, 556, 563, 545, 569, 570, 180, 181, 194, 500, 510, 511, 495, 184; 345/213, 127, 129, 130, 212, 211, 214, 204; H04N 5/04

[56] References Cited

U.S. PATENT DOCUMENTS

| | | | |
|---|---|---|---|
| 4,991,023 | 2/1991 | Nicols | 348/554 |
| 5,103,314 | 4/1992 | Keenan | 348/732 |
| 5,241,281 | 8/1993 | Wilkes et al. | 345/508 |
| 5,247,229 | 9/1993 | Ngo et al. | 315/364 |
| 5,394,171 | 2/1995 | Rabii | 345/213 |
| 5,493,317 | 2/1996 | Kim | 345/213 |
| 5,670,972 | 9/1997 | Kim | 345/13 |
| 5,673,087 | 9/1997 | Choi et al. | 348/511 |
| 5,757,366 | 5/1998 | Suzuki | 345/213 |
| 5,844,623 | 12/1998 | Iwamura | 348/553 |

FOREIGN PATENT DOCUMENTS

9508714B1 8/1995 Rep. of Korea .............. H04N 5/445

*Primary Examiner*—Michael H. Lee
*Assistant Examiner*—Jean W. Désir
*Attorney, Agent, or Firm*—Robert E. Bushnell, Esq.

[57] ABSTRACT

A sync signal self-test device includes: a pre-amplifier, for pre-amplifying red, green, and blue video signals from a computer system; a microprocessor, for checking the horizontal and vertical sync signal frequencies, and for controlling production of on screen display signals when the horizontal and vertical sync signal frequencies from the computer system are outside the operating range of the monitor, and for generating horizontal and vertical sync signals; an on screen display integrated element, for outputting, under the control of the microprocessor, error message signals in synchronization with control signals from the microprocessor; a buffer, for temporarily storing output signals from the on screen display integrated element; a mixing element, for mixing outputs of the pre-amplifier and the buffer; and a main amplifier, for amplifying the output of the mixing element for the picture tube.

20 Claims, 3 Drawing Sheets

SYNC SIGNAL SELF-TEST DEVICE AND METHOD

CLAIM OF PRIORITY

This application makes reference to, incorporates the same herein, and claims all benefits accruing under 35 U.S.C §119 from an application entitled Sync Signal Self-Test Device And Method earlier filed in the Korean Industrial Property Office on Mar. 28, 1996, and there duly assigned Ser. No. 96-8906 by that Office.

BACKGROUND OF THE INVENTION

1. Field of the Invention

The present invention relates to a display device. Specifically, this invention is a sync signal self-test device and method for determining if the frequencies of horizontal and vertical sync signals exceed the capacity of the display device, and if so, displaying the reason why they are beyond the capacity.

2. Discussion of Related Art

Generally, a computer system employs a cathode ray tube type color picture tube monitor as a display device. These display devices are designed to accommodate a standard range of horizontal and vertical sync signal frequencies. When the horizontal and vertical sync signal frequencies, which are transmitted by the computer system with color video signals, exceed the standard frequency range of the monitor, only a black raster can be displayed with the picture tube without displaying scanning patterns.

When nothing is displayed on the screen, a user is unaware that the horizontal and vertical sync signal frequencies are outside the range of the monitor, instead, misinterprets this condition as indicating that a display device is malfunctioning.

To prevent this misunderstanding, a conventional display device contains a synchronous processor for checking the horizontal and vertical sync signal frequencies transmitted by the computer system, displaying only a raster without an image signal by generating its own oscillating signal when the frequencies are beyond the range of the monitor. However, the conventional art informs the user only that the display device is malfunctioning, without indicating the reason, thus the user is unaware of the reason the image is not displayed.

SUMMARY OF THE INVENTION

Accordingly, the present invention is directed to a sync signal self-test device and method that substantially obviate one or more limitations and disadvantages of the related art.

An objective of the present invention is to provide a sync signal self-test device and method that as a result of checking the frequencies, displays a message explaining why no images are displayed on the screen of a picture tube, when the horizontal and vertical sync signal frequencies are outside the range that the display device can manage.

To achieve these and other advantages in accordance with the purpose of the present invention, as embodied and broadly described, the sync signal self-test device includes a microprocessor for checking the frequencies by measuring the horizontal and vertical sync signals transmitted by the computer system. When the horizontal/vertical sync signal frequencies are outside the range that the display device can manage, the present invention generates on screen display (OSD) signals such as: "high horizontal sync signal frequency", "low horizontal sync signal frequency", "high vertical sync signal frequency", and "low vertical sync signal frequency"; generates its own horizontal/vertical sync signals, and displays the OSD messages from the microprocessor.

Additional features and advantages of the invention will be set forth in the description which follows, and in part will be apparent from the description, or may be learned by practice of the invention. The objectives and other advantages of the invention will be realized and attained with the structure of the invention, particularly as detailed in the written description and claims hereof, as well as the appended drawings. It is to be understood that both the foregoing general description and the following detailed description are exemplary and explanatory, and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention, that together with the description serve to explain the principles of the invention, wherein.

DETAILED DESCRIPTION OF PREFERRED EMBODIMENT

Reference will now be made in detail to the preferred embodiments of the present invention, examples of which are illustrated in the accompanying drawings.

Figure 1:
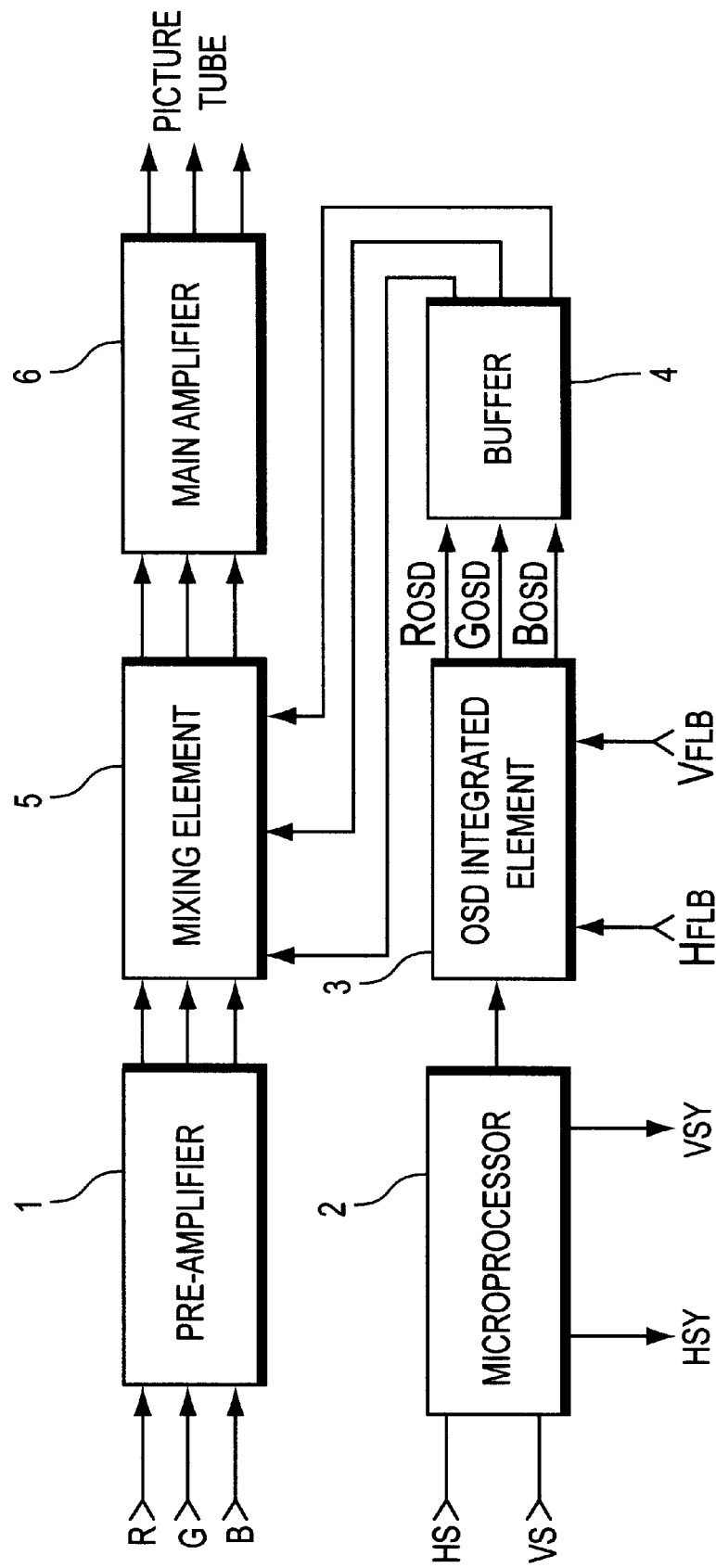
FIG. 1 is a block diagram of a self-test device according to the principles of the present invention.
Figure 2:
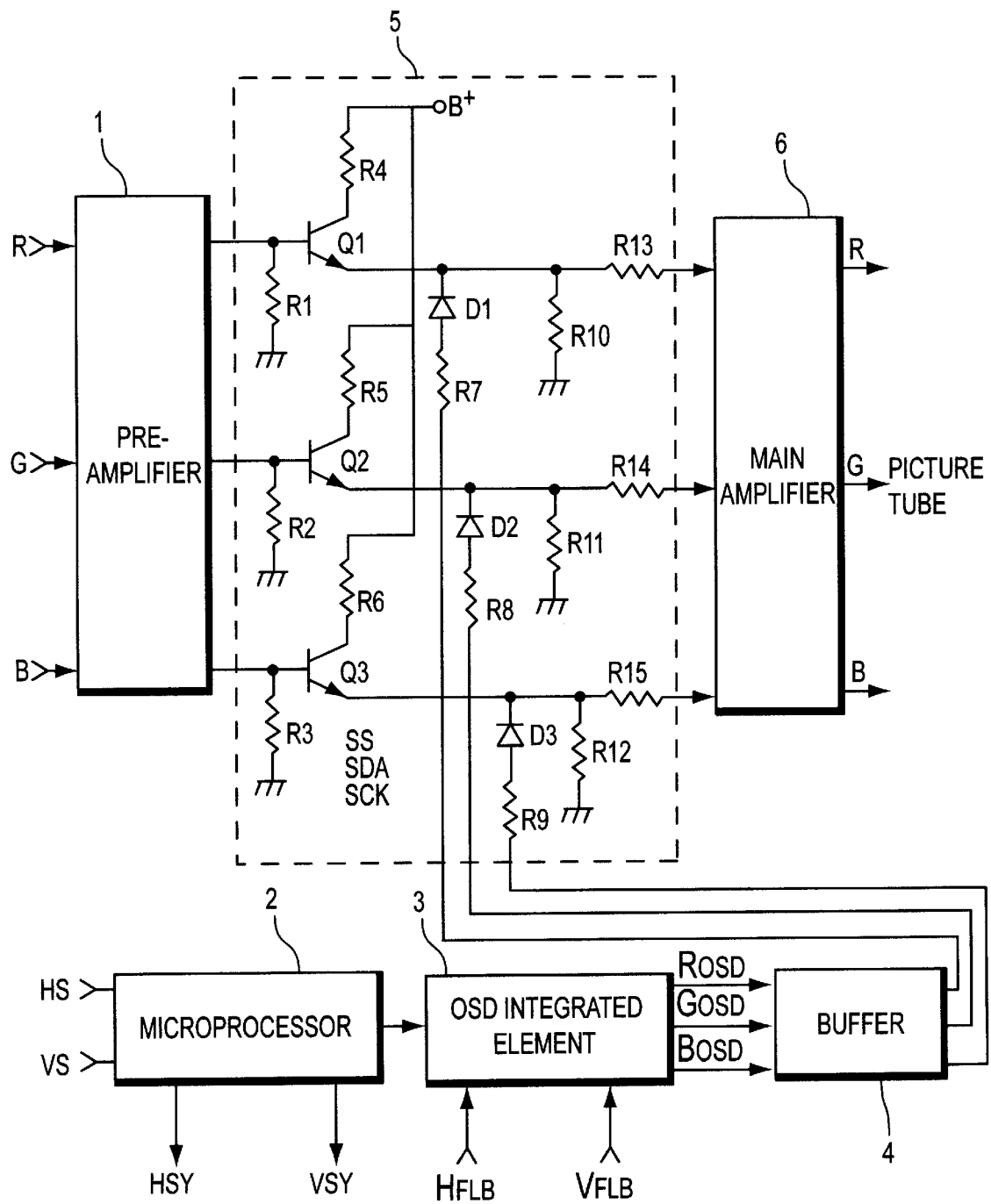
FIG. 2 illustrates an expanded circuit diagram of the mixer of the self-test device of FIG. 1 according to the principles of the present invention.

As shown in FIGS. 1 and 2, a self-test device of the present invention consists of: a pre-amplifier 1 for pre-amplifying red, green, and blue color video signals from a computer system (not shown); a microprocessor 2 for checking the horizontal and vertical sync signal frequencies HS and VS from the computer system and for controlling production of on-screen display (OSD) signals $R_{OSD}$, $G_{OSD}$, and $B_{OSD}$, and for generating horizontal and vertical sync signals HSY and VSY, when the horizontal and vertical sync signal frequencies from the computer system are outside of an acceptable range of the monitor; an OSD integrated element 3 for generating OSD signals $R_{OSD}$, $G_{OSD}$, and $B_{OSD}$ in synchronization with control signals $H_{FLB}$ and $V_{FLB}$ output by microprocessor 2; a buffer 4 for temporarily storing OSD signals $R_{OSD}$, $G_{OSD}$, and $B_{OSD}$ output from OSD integrated element 3; a mixing element 5 for mixing outputs of pre-amplifier 1 and buffer 4; and a main amplifier 6 for sending the output of mixing element 5 to the picture tube after amplifying them.

As shown in FIG. 2, in mixing element 5 the three output terminals of pre-amplifier 1 are respectively connected to grounded resistors R1, R2, and R3, and the bases of transistors Q1, Q2, and Q3. The collectors of transistors Q1, Q2, and Q3 are respectively connected to an electric power source B+ through resistors R4, R5, and R6. The three output terminals of buffer 4 are connected through serially connected resistors and diodes R7 and D1, R8 and D2, and R9 and D3, respectively, to the nodes respectively connecting the emitters of transistors Q1, Q2, and Q3, grounded resistors, R10, R11, and R12, and resistors R13, R14, and R15. Resistors R13, R14, and R15 are further connected to the three input terminals of main amplifier 6.

In the self-test device of the present invention, R, G, and B video signals, which are transmitted by the computer system when the electric power B+ is supplied, are pre-amplified by pre-amplifier 1, whereas horizontal and vertical sync signals HS and VS, are transmitted to microprocessor 2.

Figure 3:
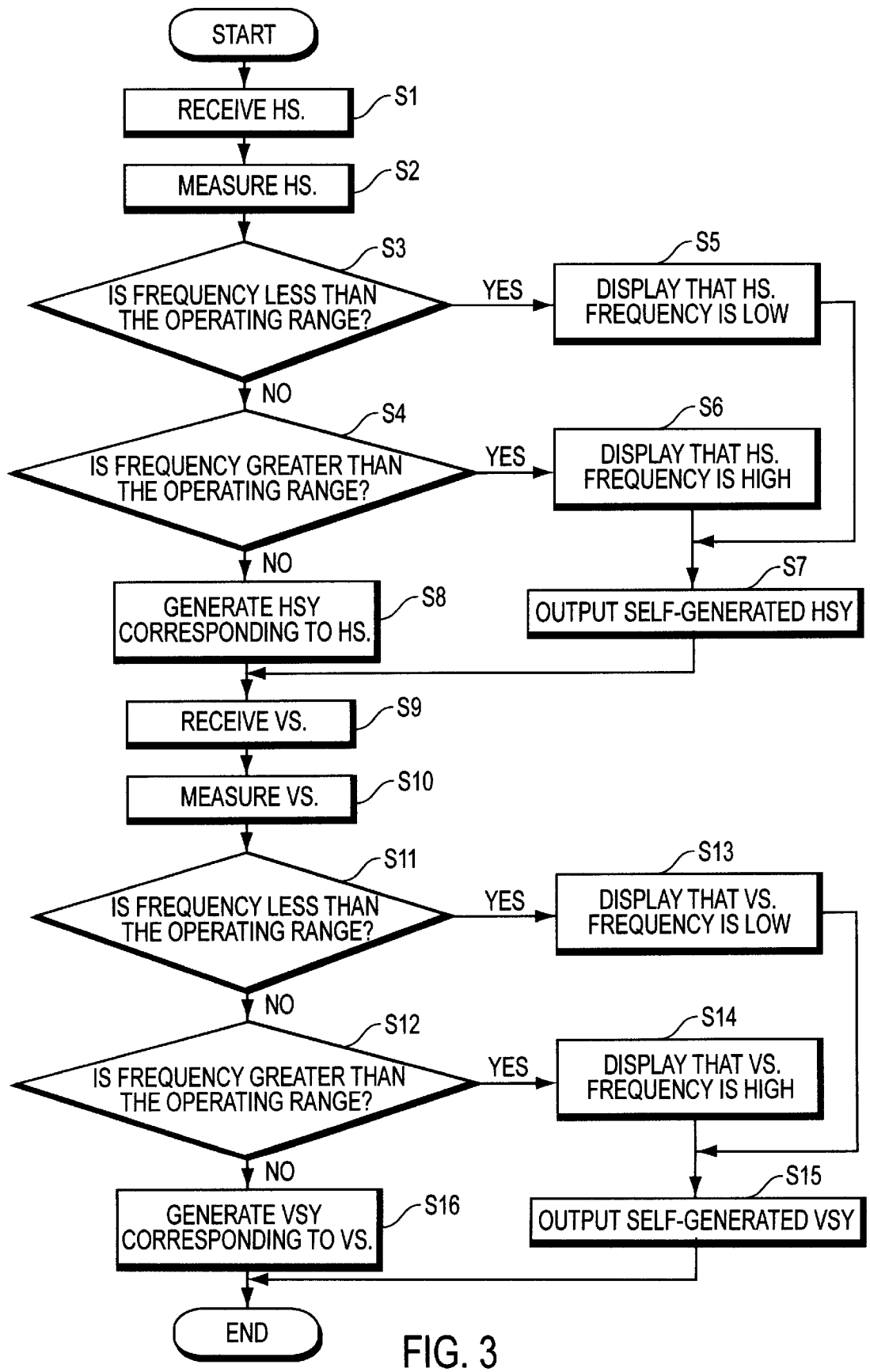
FIG. 3 is a flow chart of a self-test method according to the principles of the present invention.

As shown in FIG. 3, microprocessor 2 receives a horizontal sync signal HS (step S1) transmitted by the computer system, measures the horizontal sync signal HS (step S2) to determine whether the frequency of the horizontal sync signal HS is outside the frequency range of the monitor (steps S3 and S4). When the horizontal sync signal frequency is less than the operating range of the monitor at step S3, microprocessor 2 controls OSD integrated element 3 to output OSD signals $R_{OSD}$, $G_{OSD}$, and $B_{OSD}$ which provide a first message to be displayed to indicate a low horizontal sync signal frequency (step S5). When the horizontal sync signal (HS) frequency exceeds the monitor operating range at step S4, microprocessor 2 controls OSD integrated element 3 to output OSD signals $R_{OSD}$, $G_{OSD}$, and $B_{OSD}$ which provide a second message to be displayed to indicate a high horizontal sync signal frequency (step S6). Microprocessor 2 outputs a self-generated horizontal sync signal HSY (step S7) while generating the first or second messages of steps S5 and S6.

When it is determined in steps S3 and S4 that the frequency of horizontal sync signal HS is within the operating range of the monitor, microprocessor 2 uses horizontal sync signal HS (step S8) transmitted by the computer system to generate horizontal sync signal HSY.

Microprocessor 2 also receives a vertical sync signal VS (step S9) transmitted by the computer system, measures the vertical sync signal VS (step S10), and determines if the vertical sync signal frequency is outside of the frequency range of the monitor (steps S11 and S12). When the frequency of vertical sync signal VS is less than the range of the monitor at step S11, microprocessor 2 controls OSD integrated element 3 to output OSD signals, $R_{OSD}$, $G_{OSD}$, and $B_{OSD}$, which provide a third message to be displayed to indicate a low vertical sync signal frequency (step S13). When the frequency of vertical sync signal VS exceeds the range of the monitor at step S12, microprocessor 2 controls OSD integrated element 3 to output OSD signals, $R_{OSD}$, $G_{OSD}$, and $B_{OSD}$, which provide a fourth message to be displayed to indicate a high vertical sync signal frequency (step S14). Microprocessor 2 outputs a self-generated vertical sync signal VSY (step S15) while generating the third or fourth messages of steps S13 and S14.

When it is determined in steps S11 and S12 that the frequency of vertical sync signal VS is within the operating range of the monitor, microprocessor 2 uses vertical sync signal VS (step S16) transmitted by the computer system to generate vertical sync signal VSY.

The OSD signals $R_{OSD}$, $G_{OSD}$, and $B_{OSD}$, which are generated by OSD integrated element 3 under the control of microprocessor 2, are transmitted to buffer 4 in synchronization with control signals $H_{FLB}$ and $V_{FLB}$.

Mixing element 5 mixes the outputs of pre-amplifier 1, through the emitters of transistors Q1, Q2, and Q3 with OSD signals $R_{OSD}$, $G_{OSD}$, and $B_{OSD}$, which are input through buffer 4 and transmitted through resistors, R7, R8, and R9, and diodes, D1, D2, and D3. The relative strengths of the mixed signals are controlled by resistors, R10 and R13, R11 and R14, and R12 and R15. The mixed signals are supplied to the monitor's picture tube after amplification by main amplifier 6.

As described above, the present invention detects the cases where the horizontal and vertical sync signal frequencies input to the monitor of a computer system are outside the operating range the monitor can handle under normal conditions, and then displays appropriate error messages on the screen, using OSD characters, thereby informing the user of the exact reason why no images are displayed on the screen.

It will be apparent to those skilled in the art that various modifications and variations can be made to the sync signal self-test device of the present invention without deviating from the spirit or scope of the invention. Thus, it is intended that the present invention cover the modifications and variations of this invention that come within the scope of the appended claims and their equivalents.

What is claimed is:

1. A sync signal self-test device of a computer system utilizing a computer and a monitor, wherein said device comprises:

a pre-amplifier for pre-amplifying red, green, and blue video signals from said computer;

a microprocessor for measuring frequencies of horizontal and vertical sync signals received from said computer;

on-screen display means for outputting red, green and blue on-screen display signals in synchronization with control signals from said microprocessor;

said microprocessor for generating said control signals when said frequencies of said horizontal and vertical sync signals received from said computer are outside a frequency range of said monitor;

said microprocessor for generating self-generated horizontal and vertical sync signals when said frequencies of said horizontal and vertical sync signals received from said computer are outside said frequency range of said monitor;

said microprocessor for generating horizontal and vertical sync signals corresponding to said horizontal and vertical sync signals received from said computer, when said frequencies of said horizontal and vertical sync signals received from said computer are within said frequency range of said monitor;

a buffer for temporarily storing said red, green and blue on-screen display signals output from said on-screen display means;

mixing means for providing a mixed output by mixing outputs from said pre-amplifier and said buffer; and a main amplifier for amplifying said mixed output for display on said monitor.

2. The device as set forth in claim 1, wherein said mixing means comprises:

a first transistor having a base connected to a first output of said pre-amplifier for receiving said red video signal, a collector connected to a voltage source trough a first resistor and an emitter connected to a first node;

a second transistor having a base connected to a second output of said pre-amplifier for receiving said green video signal, a collector connected to said voltage source through a second resistor and an emitter connected to a second node;

a third transistor having a base connected to a third output of said pre-amplifier for receiving said blue video signal, a collector connected to a voltage source through a third resistor and an emitter connected to a third node;

a first diode having a cathode connected to said first node;

a fourth resistor connected between an anode of said first diode and a first output of said buffer for receiving said red on-screen display signal;

a second diode having a cathode connected to said second node;

a fifth resistor connected between an anode of said second diode and a second output of said buffer for receiving said green on-screen display signal;

a third diode having a cathode connected to said third node;

a sixth resistor connected between an anode of said third diode and a third output of said buffer for receiving said blue on-screen display signal;

a seventh resistor connected between said first node and a first input of said main amplifier;

an eighth resistor connected between said first node and a first input of said main amplifier;

a ninth resistor connected between said first node and a first input of said main amplifier;

a tenth resistor connected between said base of said first transistor and ground;

a eleventh resistor connected between said base of said send transistor and ground;

a twelfth resistor connected between said base of said third transistor and ground;

a thirteenth resistor connected between said first node and ground;

a fourteenth resistor connected between said second node and ground; and a fifteenth resistor connected between said third node and ground.

3. The device as set forth in claim 1, wherein said microprocessor controls said on-screen display means to output said red, green and blue on-screen display signals when said frequency of said horizontal sync signal received from said computer is below a horizontal frequency range of said monitor, wherein said red, green and blue on-screen display signals correspond to a message indicating that said frequency of said horizontal sync signal received from said computer is low.

4. The device as set forth in claim 1, wherein said microprocessor controls said on-screen display means to output said red, green and blue on-screen display signals when said frequency of said horizontal sync signal received from said computer is above a horizontal frequency range of said monitor, wherein said red, green and blue on-screen display signals correspond to a message indicating that said frequency of said horizontal sync signal received from said computer is high.

5. The device as set forth in claim 1, wherein said microprocessor controls said on-screen display means to output said red, green and blue on-screen display signals when said frequency of said vertical sync signal received from said computer is below a vertical frequency range of said monitor, wherein said red, green and blue on-screen display signals correspond to a message indicating that said frequency of said vertical sync signal received from said computer is low.

6. The device as set forth in claim 1, wherein said microprocessor controls said on-screen display means to output said red, green and blue on-screen display signals when said frequency of said vertical sync signal received from said computer is above a vertical frequency range of said monitor, wherein said red, green and blue on-screen display signals correspond to a message indicating that said frequency of said vertical sync signal received from said computer is high.

7. A sync signal self-test method performed by a microprocessor connected between a computer and a monitor, said method comprising the steps of:

receiving horizontal and vertical sync signals from said computer;

measuring frequencies of said horizontal and vertical sync signals;

determining whether said measured frequencies are outside an operating range of said monitor;

generating an on-screen display message and self-generated horizontal and vertical sync signals when said measured frequencies of said horizontal and vertical sync signals are outside said operating range; and producing horizontal and vertical sync signals corresponding to said horizontal and vertical sync signals from said computer, when said frequencies of said horizontal and vertical sync signals from said computer are within said operating range.

8. The method as set forth in claim 7, wherein said step of generating an on-screen display message comprises the steps of:

generating red, green and blue on-screen display signals corresponding to said message; and mixing said red, green and blue on-screen display signals with red, green and blue video signals output from said computer.

9. The method as set forth in claim 8, wherein said step of generating an on-screen display message further comprises a step of temporarily storing said red, green and blue on-screen display signals in a buffer prior to said step of mixing.

10. The method as set forth in claim 7, wherein said step of generating an on-screen display message comprises a step of generating a message indicating that said frequency of said horizontal sync signal received from said computer is low, when said frequency of said horizontal sync signal received from said computer is below a horizontal frequency range of said monitor.

11. The method as set forth in claim 7, wherein said step of generating an on-screen display message comprises a step of generating a message indicating that said frequency of said horizontal sync signal received from said computer is high, when said frequency of said horizontal sync signal received from said computer is above a horizontal frequency range of said monitor.

12. The method as set forth in claim 7, wherein said step of generating an on-screen display message comprises a step of generating a message indicating that said frequency of said vertical sync signal received from said computer is low, when said frequency of said vertical sync signal received from said computer is below a vertical frequency range of said monitor.

13. The method as set forth in claim 7, wherein said step of generating an on-screen display message comprises a step of generating a message indicating that said frequency of said vertical sync signal received from said computer is high, when said frequency of said vertical sync signal received from said computer is above a vertical frequency range of said monitor.

14. A sync signal self-test device of a computer system utilizing a computer and a monitor, wherein said device comprises:

a microprocessor for measuring frequencies of horizontal and vertical sync signals received from said computer, for generating control signals when said frequencies of said horizontal and vertical sync signals received from said computer are outside a frequency range of said monitor, for generating horizontal and vertical sync signals corresponding to said horizontal and vertical sync signals received from said computer, when said frequencies of said horizontal and vertical sync signals received from said computer are within said frequency range of said monitor, and for generating self-generated horizontal and vertical sync signals when said frequencies of said horizontal and vertical sync signals received from said computer are outside said frequency range of said monitor;

on-screen display means for outputting on-screen display signals in synchronization with said control signals from said microprocessor; and means for providing a mixed output signal by mixing video signals output by said computer with said on-screen display signals.

15. The device as set forth in claim 14, further comprising a pre-amplifier for receiving said video signals from said computer and outputting amplified red, green and blue video signals.

16. The device as set forth in claim 14, wherein said on-screen display means comprises means for outputting red, green and blue on-screen display signals.

17. The device as set forth in claim 14, further comprising a buffer for temporarily storing said on-screen display signals prior to said on-screen display signals being mixed with said video signals output by said computer by said means for mixing.

18. The device as set forth in claim 15, further comprising:

said on-screen display means comprising means for outputting red, green and blue on-screen display signals; and a buffer for temporarily storing said red, green and blue on-screen display signals prior to said on-screen display signals being mixed with said video signals output by said computer by said means for mixing.

19. The device as set forth in claim 18, wherein said means for providing a mixed output signal comprises:

a first transistor having a base connected to a first output of said pre-amplifier for receiving said red video signal, a collector connected to a voltage source trough a first resistor and an emitter connected to a first node;

a second transistor having a base connected to a second output of said pre-amplifier for receiving said green video signal, a collector connected to said voltage source through a second resistor and an emitter connected to a second node;

a third transistor having a base connected to a third output of said pre-amplifier for receiving said blue video signal, a collector connected to a voltage source through a third resistor and an emitter connected to a third node;

a first diode having a cathode connected to said first node;

a fourth resistor connected between an anode of said first diode and a first output of said buffer for receiving said red on-screen display signal;

a second diode having a cathode connected to said second node;

a fifth resistor connected between an anode of said second diode and a second output of said buffer for receiving said green on-screen display signal;

a third diode having a cathode connected to said third node;

a sixth resistor connected between an anode of said third diode and a third output of said buffer for receiving said blue on-screen display signal;

a seventh resistor connected between said first node and a first input of said main amplifier;

an eighth resistor connected between said first node and a first input of said main amplifier;

a ninth resistor connected between said first node and a first input of said main amplifier;

a tenth resistor connected between said base of said first transistor and ground;

a eleventh resistor connected between said base of said send transistor and ground;

a twelfth resistor connected between said base of said third transistor and ground;

a thirteenth resistor connected between said first node and ground;

a fourteenth resistor connected between said second node and ground; and a fifteenth resistor connected between said third node and ground.

20. The device as set forth in claim 14, further comprising a main amplifier for outputting an amplified mixed video signal by amplifying said mixed output signal and providing said amplified mixed video signal to said monitor for displaying one of four messages indicating whether said frequencies of said horizontal and vertical sync signals received from said computer are outside a frequency range of said monitor.

* * * * *